Patented Aug. 14, 1923.

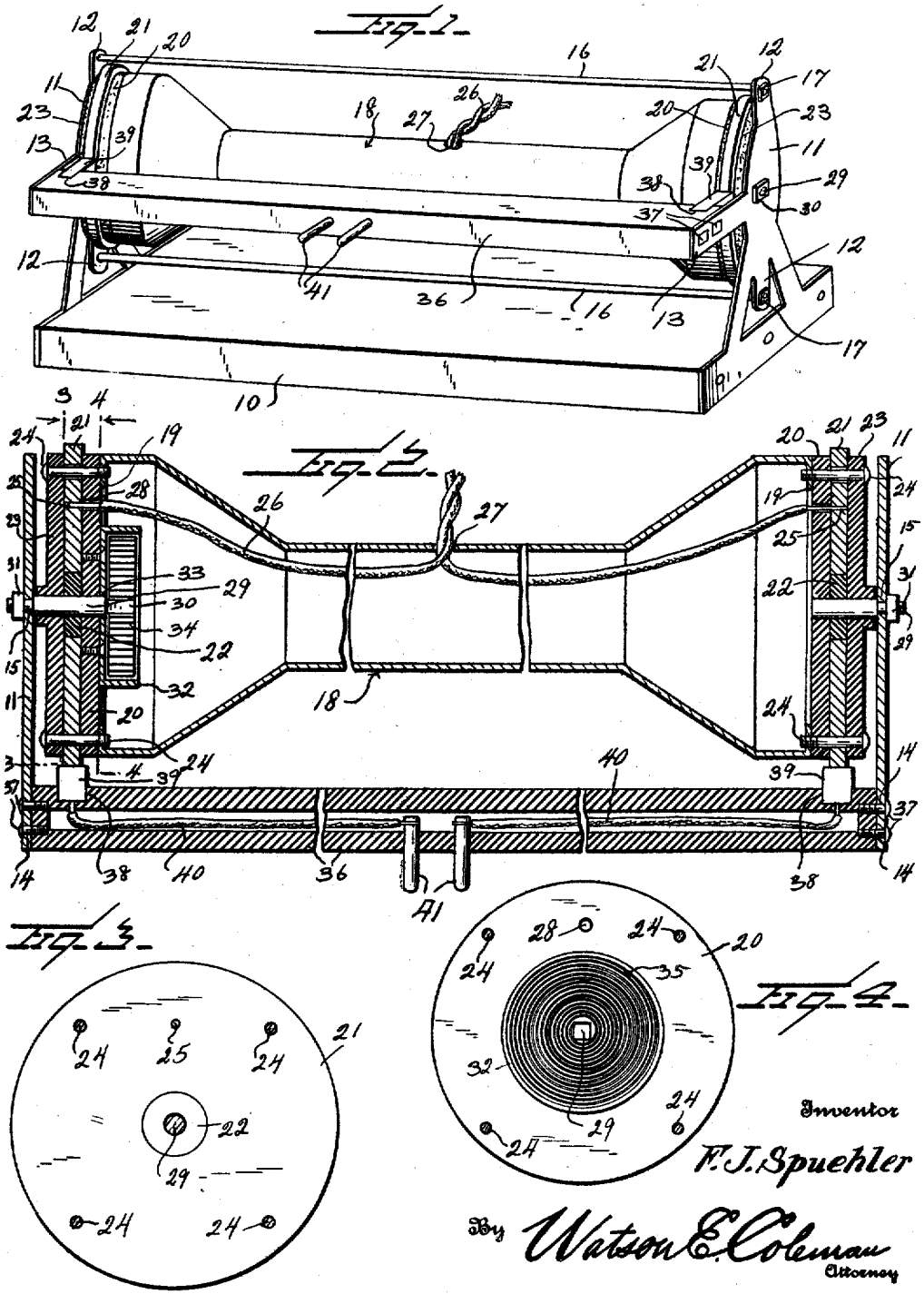

1,464,631

UNITED STATES PATENT OFFICE.

FRED J. SPUEHLER, OF TOLEDO, OHIO.

REEL FOR CONDUCTING CORDS.

Application filed September 28, 1921. Serial No. 503,767.

*To all whom it may concern:*

Be it known that I, FRED J. SPUEHLER, a citizen of the United States, residing at Toledo, in the county of Lucas and State of Ohio, have invented certain new and useful Improvements in Reels for Conducting Cords, of which the following is a specification, reference being had to the accompanying drawings.

This invention relates to spring reels and has for its object the provision of a reel designed to be used in connection with the conducting cord associated with electric irons and other electrical appliances whereby to hold the cord under tension and to prevent the formation of any slack therein which might cause tangling and consequent kinking of the wire.

An important and more specific object is the provision of a winding reel upon which the conducting cord is wound and which is provided internally with spring tension means tending always to wind up the cord.

Another object is the provision of a reel of this character which is provided with novel means whereby a constant electrical contact will be maintained so that current will be supplied to the conducting cord at all times.

An additional object is the provision of a device of this character which will be simple and inexpensive in manufacture, easy to assemble, efficient in use, durable in service and a general improvement in the art.

With the above and other objects and advantages in view, the invention consists in the details of construction to be hereinafter more fully described and claimed, and illustrated in the accompanying drawings, in which:

Figure 1 is a perspective view of my device;

Figure 2 is a longitudinal sectional view therethrough taken in a horizontal plane;

Figure 3 is a cross sectional view on the line 3—3 of Figure 2; and

Figure 4 is a cross sectional view on the line 4—4 of Figure 2.

Referring more particularly to the drawings, I have shown my device as comprising a suitable base 10 upon which are secured upright end members 11 which are of circular shape and which are formed at their highest and lowest points with apertured ears 12 and which are also formed at intermediate points with extensions 13 each formed with two holes 14. The end members 11 are also provided centrally with bearing holes 15, for a purpose to be described. The two end frames 11 are held in proper spaced relation by means of rods 16 which have reduced threaded ends passing through the apertured ears 12 and carrying nuts 17.

Rotatable between the end frames 11 is a drum designated broadly by the numeral 18 and this drum is formed hollow and of substantially spool shape, being provided at its outer ends with flanges 19. Located within and secured to the flanges 19, by means of screws or the like, are disks 20 formed of fiber, hard rubber or other suitable insulating material, and disposed outwardly of these disks are disks 21 of somewhat larger diameter which are formed of copper but which have their central portions 22 formed of insulating material. Outwardly of the disks 21 I provide other disks 23 likewise formed of insulating material and of slightly less diameter than the disks 21. These sets of three disks are secured together by means of suitable screws 24 which pass through all of them in each set, certain of the holes being smooth and others being tapped out as is of course necessary. Secured to the copper disks 21, as indicated at 25, are the ends of the conducting wires 26 which pass through the central portion of the reel and which pass out through a hole 27 at substantially the center thereof. These wires 26 subsequent to their issuance from the spool or reel are of course twisted together in the usual manner common to conducting cords used in connection with electric irons and other similar appliances. The disks 20 are of course formed with holes 28 through which the wires 26 pass.

The reel is supported upon shafts 29 one of which has one end formed with a squared portion 30. These shafts extend through the centers of the disks and through the holes 15 in the end members 11 and are held in position by means of suitable nuts 31 which are engaged upon the projecting ends. Secured against the inner face of one of the disks 20 is a cup shaped shell 32 having a central hole 33 through which the shaft 29 passes. Located within this shell is a spiral spring 34 which has one end secured to the inner periphery of the shell, as indicated at 35, and which has its other end secured upon the squared end of the shaft 29.

Extending between the end members 11 is a bar 36 which is provided at its ends with pins 37 which are passed through the holes 14 in the extensions 13 of the end members and subsequently bent over or clinched. At its edge toward the reel the bar 36 is formed with slots 38 within which are located brushes 39 so positioned as to bear against the peripheries of the copper disks 21. Connected with these brushes are wires 40 which extend along within the bar 36 and which are connected with the pins 41 which project from the outer face of the bar and which are adapted for association with any of the ordinary push socket connectors used in connection with electrical appliances, it being understood of course that such connection must be connected with an electric light socket or the like for supplying current to the brushes 39, thence to the disks 21 and from them to the wires 26.

In the use of the device it will be seen that initially the conducting cord is wound upon the reel and that the spring 34 is not under tension. When the cord is unwound during the use of an electrical appliance associated therewith, it will be apparent that the reel 18 will be rotated upon the shaft 29 and this will of course result in placing the spring 34 under tension so that there is a constant pull tending to rewind the reel and this will of course naturally result in holding the conducting cord taut and prevent any slackness and consequent kinking. Owing to the provision of the copper disks with which the ends of the conducting wires are connected and the engagement of the brushes with these copper disks it will be apparent that current will always be supplied to the conducting cord even while the reel is being rotated.

From the foregoing description and a study of the drawings it will be apparent that I have thus provided a simply constructed and consequently inexpensive device of the character specified which may be readily used and which will efficiently operate to perform all the functions for which it is intended. Owing to the simplicity of the construction it is not likely that there will be any derangement of the parts and that the device should consequently have a long life and be satisfactory in every way.

While I have shown and described the preferred embodiment of the invention, it is of course to be readily understood that I reserve the right to make such changes in the form, construction and arrangement of parts as will not depart from the spirit of the invention or the scope of the sub-joined claims.

Having thus described my invention, I claim:

1. In a reel of the character described, a hollow drum, ends for said drum each comprising a pair of spaced insulating plates and a conducting plate arranged intermediate said insulating plates, securing elements extending through the ends securing the plates of each end together and the ends to said drum, said drum and the inner plates of said ends being provided with openings permitting the insertion of conducting elements through the drum for engagement with the conducting plates of said ends, and a rotatable support for said drum including shafts journaled in said ends.

2. In a reel of the character described, a hollow drum provided at its ends with inturned flanges, ends for said drum each comprising a pair of spaced insulating plates and a conducting plate arranged intermediate said insulating plates and of greater diameter than the insulating plates, securing elements extending through the plates of each of said ends and having threaded engagement with the flanges of said drum, said drum and the inner plate of each of said ends being each provided with an opening permitting the connection of the conducting elements with the conducting plates of said ends through said drum, a rotatable support for the drum including shafts extending through said ends, and a spring having one end engaged with the shaft at one end of the drum and its opposite end secured to the end of the drum.

In testimony whereof I hereunto affix my signature.

FRED J. SPUEHLER.